Figure 1:
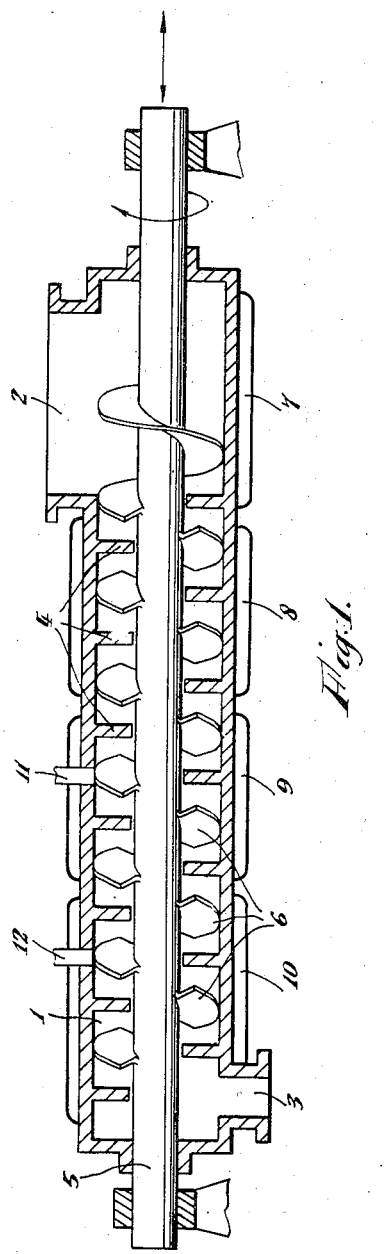

Sept. 30, 1958   R. CLEVY ET AL   2,854,445
CONTINUOUS PROCESS FOR THE ESTERIFICATION
OF CELLULOSE IN HOMOGENEOUS PHASE
Filed March 5, 1957   2 Sheets-Sheet 1

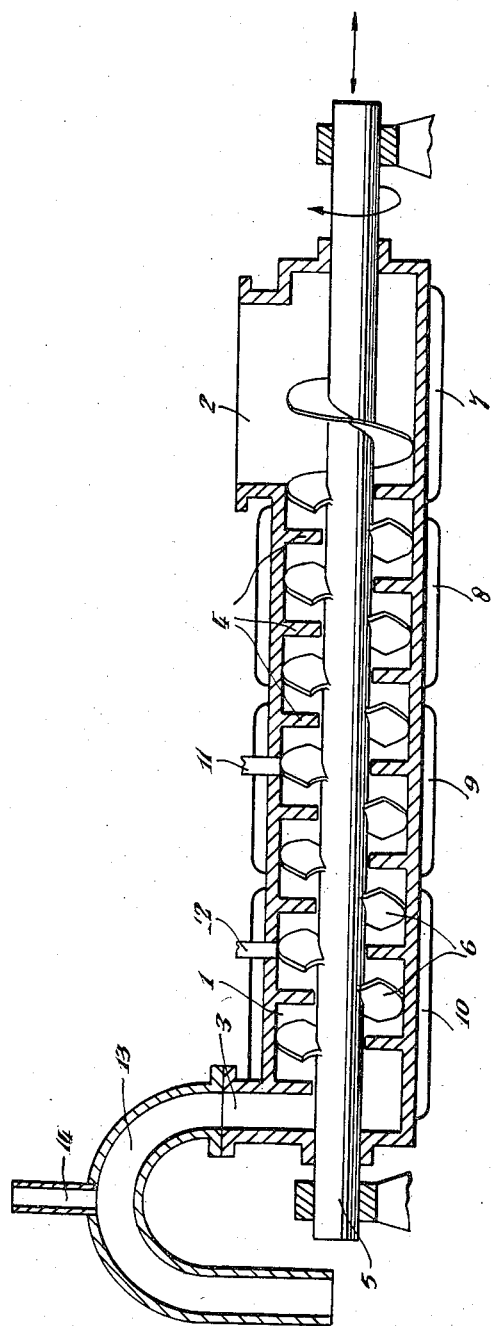

United States Patent Office 2,854,445
Patented Sept. 30, 1958

2,854,445

CONTINUOUS PROCESS FOR THE ESTERIFICATION OF CELLULOSE IN HOMOGENEOUS PHASE

Roland Clevy, Le-Peage-de-Roussillon, and Jean Robin, Roussillon, France, assignors to Societe Rhodiaceta, Paris, France, a corporation of France Application March 5, 1957, Serial No. 643,984

Claims priority, application France October 15, 1952

2 Claims. (Cl. 260—214)

The present invention relates to a process for the continuous esterification of cellulose in homogeneous phase, and is a continuation-in-part of application Serial No. 330,968, now Patent No. 2,801,237.

It is an object of the invention to provide a simple process for the continuous esterification of cellulose in homogeneous phase.

It is another object of the invention to provide a process for such esterification of cellulose which is capable of being utilised on an industrial scale without overmuch maintenance trouble.

Further objects of the present invention will become apparent hereinafter.

The present invention consists in a process for the continuous esterification of cellulose in homogeneous phase consisting essentially in continuously treating the cellulose with esterifying agents, causing the resulting reaction mass to undergo an overall displacement in a cylindrical reaction zone having a substantially horizontal axis from a point of entry towards a discharge point while subjecting the said mass both to a rotary and a reciprocating movement, subjecting the said mass to the action of counter pressure directed in a direction opposed to that of the overall displacement, and regulating the temperature of the said mass while in the reaction zone by thermal exchange effected both along the axis of the cylindrical reaction zone and at its periphery.

The present invention also consists in a process for the continuous esterification of cellulose in homogeneous phase consisting essentially in continuously treating the cellulose with esterifying agents, causing the resulting reaction mass to undergo an overall displacement in a reaction zone having a substantially horizontal axis from a point of entry towards a discharge point while subjecting the said mass both to a rotary and reciprocating movement, introducing esterifying agents at conveniently situated positions spaced apart along said reaction zone, subjecting the said mass to the action of counter pressure applied in a direction opposed to that of the overall displacement and regulating the temperature of the said mass while in the reaction zone by thermal exchange effected both along the axis of the cylindrical reaction zone and at its periphery.

By reciprocating movement, as used herein, it meant a straight line reciprocating movement.

In the above process the esterifying agents may be added to the cellulose entirely before the reaction mass enters the cylindrical reaction zone. However, preferably only a part of these esterifying agents are added to the cellulose before it enters said zone, the remainder being introduced at conveniently located positions spaced along that zone.

The twofold movement of rotation and reciprocation, through which twofold movement there results an overall displacement of the reaction mass from one extremity of the cylindrical reaction zone to the other, may be imparted to the said mass by using an apparatus described in Patent No. 2,505,125 in which a shaft provided with separate helicoidal paddles forming a worm member is made to rotate and reciprocate in the interior of a container of which the internal surface is provided with ribs.

Typical apparatus for effecting the process of the invention is illustrated in the accompanying diagrammatic drawings, in which:

Figure 1 is a cross section through apparatus, in front elevation, devoid of means for exerting the said counter pressure, this figure being given by way of comparison only, and Figure 2 is a cross section through apparatus, in front elevation, suitable for carrying out the process of the invention.

The apparatus shown in Figures 1 and 2 will be described in detail in the examples given hereinafter.

The counter pressure must act on the said reaction mass in a direction opposed to the overall displacement of the reaction mass in the cylindrical reaction zone. The magnitude of this counter pressure is a function of the viscosity of the reaction mass, the amplitude and frequency of the reciprocating movement imparted to the reaction mass as well as its rotary motion. Using the type of esterification mixture shown in the examples given hereinafter, excellent results are obtained with a counter pressure from 0.030 to 0.100 kg. per square centimetre, but it must be understood that these values are not to be considered limitative. This counter pressure may be exerted by any suitable means, for example by the action of a compressed inert gas introduced in the vicinity of the discharge point of the cylindrical reaction zone, it being understood that the counter pressure is opposed to the overall displacement of the reaction mass from its point of entry into the cylindrical reaction zone towards the point of discharge. However, a very simple way of effectively producing this counter pressure consists in passing the reaction mass reaching the discharge point in the cylindrical reaction zone into an inverse U-tube provided with means to avoid the inverse U-tube from acting as a syphon (e. g. a pipe open to the atmosphere located at the center of the curved portion of the inverted U-tube). By giving suitable dimensions to the section of this inverted U-tube and to the height of the ascending branch of the U there may be produced a counter pressure which has the required constant value.

One would have expected that such a counter pressure which acts in the opposite direction to the overall displacement of the reaction mass, would diminish—for a given apparatus—the hourly capacity of producing cellulose ester of good quality. It is therefore very surprising, as may be seen from the examples given hereinafter, that the said hourly production capacity of the apparatus is increased over that of similar apparatus devoid of means for setting up the said counter pressure. The production increase obtained by using the process of the invention may quite easily attain 50 and even 100 percent; furthermore, this production increase is accompanied by an appreciable improvement in the quality of the cellulose esters resulting by the process of the invention.

The temperature of the reaction mass is controlled and regulated by means of thermal exchange effected both along the axis of the cylindrical reaction zone and at its periphery. When an apparatus of the type indicated above is used, of which the shaft carrying the paddles is hollow and the container is surrounded by jackets, there is circulated in the shaft and each of the jackets a fluid, for example water, at a suitable temperature. Furthermore, it is preferably for the paddles on the shaft themselves to be hollow and for a fluid to be circulated therethrough so as to facilitate the temperature control and regulation.

The following comparative examples are given by way of illustration in order to enable the invention to be better understood.

*Example 1*

In this example the esterification is effected in the absence of counter pressure.

An apparatus illustrated in Fig. 1 of the accompanying drawings is used. In this apparatus a shaft 5 is provided with separating paddles 6 arranged helicoidally; the shaft has imparted to it both a reciprocating and a rotary movement (by known means, not shown) in the interior of the container 1 of which the internal surface is provided with ribs 4. In the container 1 there is provided an entrance orifice 2 and an exit orifice 3 as well as tubes 11 and 12 for introducing esterifying agents. The shaft 5 and the paddles 6 are hollow so that it is possible to circulate water in order to control and regulate the temperature. The casing 1 is surrounded by jackets 7, 8, 9 and 10 in which it is also possible to circulate water at the desired temperature. Through orifice 2 there is introduced continuously 150 kg. per hour of cellulose (calculated on the dry weight of the cellulose) impregnated with twice its weight of acetic acid, and, at the same time, 300 litres per hour of glacial acetic acid. Through tubes 11 and 12 there is introduced, in two equal portions and continuously, 870 litres per hour of a mixture of the following:

| | Parts by weight |
|---|---|
| Glacial acetic acid | 500 |
| Acetic anhydride | 360 |
| Concentrated sulphuric acid (66° Bé.) | 9 |

In order to regulate the temperature there is circulated in shaft 5 and paddles 6 water at a temperature of 12° C., in jacket 7 water at a temperature of 12° C., in jacket 8 water at a temperature of 20° C., in jacket 9 water at a temperature of 40° C., and in jacket 10 water at a temperature of 55° C.

On its issuance from the apparatus by way of the exit orifice 3 the reaction mass is led into a mixing apparatus where the acetylation operation is stopped by the addition of 450 litres per hour of a mixture of:

| | Parts by weight |
|---|---|
| Acetic acid | 60 |
| Water | 40 |

Thereafter hydrolysis, precipitation, washing and drying are effected by known methods. The cellulose acetate obtained in this way has the following properties: Acetyl value calculated as acetic acid 54.7%, viscosity 406 poises, and filterability 500 cubic centimetres.

On attempting to increase the hourly output of the apparatus, for example by bringing to 200 kg. per hour the quantity of cellulose introduced through entrance orifice 2 and by increasing in the same proportion the amount of acetylating agents used, it is found that there occurs a very appreciable deterioration in the quality of the resulting cellulose acetate as follows: Acetyl value calculated as acetic acid 54.7%, viscosity 305 poises, and filterability 190 cubic centimetres.

Such a product has practically no commercial value as it is almost incapable of being used, for example, for the manufacture of artificial textile elements (e. g. threads, staple fibers etc.) or plastics.

*Example 2*

In this example the esterification is effected by a process comprising the use of counter pressure.

For this purpose there is used the apparatus shown in Figure 2 of the accompanying drawings. This apparatus is analogous to the one used in Example 1; it comprises the same elements and the dimensions are the same and therefore has the same capacity. Similar reference numerals in Figures 1 and 2 indicate similar apparatus parts.

However, in order to submit the reaction mass to the action of counter pressure the exit orifice 3 is located at the upper surface of the container 1 and there is fixed above this orifice a tube 13 in the form of an inverse U. The center of the upper portion of the U is provided with a short pipe 14 which is open to the atmosphere. It will thus be seen that reaction mass in the ascending branch of the U-tube 13 will exert a counter pressure on material being passed through the container.

For the purposes of carrying out the procedure adopted in this example the height of the ascending branch of the U-tube is 50 centimetres and its cross section has an area of 2,700 square centimetres; these dimensions cause the setting up of a counter pressure of approximately 0.070 kg. per square centimetre.

The working method followed is similar to the one of Example 1, but the amount of cellulose impregnated with twice its weight of acetic acid introduced through entrance orifice 2 is 260 kg. per hour (calculated on the dry weight of cellulose), that is to say the amount of impregnated cellulose is greater by approximately 75% than the amount of impregnated cellulose it is possible to acetylate with good results with a similar apparatus devoid of the device setting up counter pressure. The amounts of acetylating agents used are proportionately increased over those used in Example 1. In order to stop the acetylation, to effect hydrolysis, precipitation, washing and drying, a similar procedure is adopted as in Example 1.

The cellulose acetate obtained in the manner indicated above has the following properties: Acetyl value calculated as acetic acid 54.7%, viscosity 605 poises, and filterability 1,230 cubic centimetres.

In this way it is seen that the use of the acetylation process with counter pressure, i. e. the process of the invention, has enabled not only an increase by about 75% of the hourly production but also an appreciable improvement in the quality of the cellulose acetate resulting thereby is obtained.

It should be noted that the apparatus shown in Figure 2 may be provided, in the pipe 14, with a valve so that the pipe 14 may be closed to the atmosphere whereby the container 1 may be initially charged with reaction mass without any reaction mass being forced out by way of the pipe 14; it should be noted, however, that during normal use of the apparatus the said valve will be open to the atmosphere.

Although the present invention has been described with particular reference to specific details, it is not intended that such details shall be regarded as limitations upon the scope of the invention except insofar as included in the accompanying claims.

What we claim and desire to secure by Letters Patent is:

1. A process for the continuous esterification of cellulose in homogeneous phase consisting essentially in continuously treating the cellulose with esterifying agents, causing the resulting reaction mass to undergo an overall displacement with a combined rotary and reciprocating movement in a cylindrical reaction zone having a substantially horizontal axis from a point of entry towards a discharge zone, while subjecting the said mass in said discharge zone to a predetermined counter pressure in a a direction opposed to that of the overall displacement and produced from a source outside of said reaction zone, and regulating the temperature of the said mass while in the reaction zone by thermal exchange with a temperature control fluid.

2. A process for the continuous esterification of cellulose in homogeneous phase consisting essentially in continuously treating the cellulose with esterifying agents, causing the resulting reaction mass to undergo an overall displacement with a combined rotary and reciprocating movement in a cylindrical reaction zone having a substantially horizontal axis from a point of entry towards a discharge zone, discharging the reaction mass from said discharge zone in the form of a continuous column extending to a predetermined elevation above said reaction zone whereby the pressure on said column subjects the said mass in said discharge zone to a predetermined counter-pressure in a direction opposed to that of the overall displacement, and regulating the temperature of the said mass while in the reaction zone by thermal exchange with a temperature control fluid.

References Cited in the file of this patent

UNITED STATES PATENTS

| | | |
|---|---|---|
| 1,859,579 | Bidaud | May 24, 1932 |
| 2,505,125 | List | Apr. 25, 1950 |